United States Patent [19]
DiMeo

[11] 4,271,370
[45] Jun. 2, 1981

[54] DOUBLE AIR GAP PRINTED CIRCUIT ROTOR

[75] Inventor: Frank N. DiMeo, Drexel Hill, Pa.

[73] Assignee: Litton Systems, Inc., Clifton Heights, Pa.

[21] Appl. No.: 77,853

[22] Filed: Sep. 21, 1979

[51] Int. Cl.³ .............................................. H02K 1/22
[52] U.S. Cl. .................................... 310/266; 310/207; 336/200
[58] Field of Search ............... 310/261, 264, 266, 207, 310/DIG. 6; 336/200

[56] References Cited

U.S. PATENT DOCUMENTS

| | | | |
|---|---|---|---|
| 3,084,420 | 4/1973 | Burr et al. ............................... | 29/598 |
| 3,209,187 | 9/1965 | Angele ................................... | 310/266 |
| 3,487,246 | 12/1969 | Long ....................................... | 310/266 X |
| 3,609,431 | 9/1971 | Lifschitz ................................ | 310/266 |
| 3,698,079 | 1/1972 | Lifschitz ................................ | 29/598 |
| 3,736,543 | 5/1973 | Lademann et al. .................. | 336/200 |
| 3,737,697 | 6/1973 | Kitamori et al. .................... | 310/207 |
| 3,805,104 | 4/1974 | Margrain et al. .................... | 310/266 |
| 3,816,907 | 6/1974 | Small ..................................... | 29/598 |
| 3,869,788 | 3/1975 | Lazaroiu ............................... | 29/597 |
| 3,944,857 | 3/1976 | Faulhaber ............................ | 310/266 |

FOREIGN PATENT DOCUMENTS 1003474 of 0000 Canada .
395947 1/1974 U.S.S.R. ............................ 310/DIG. 6

Primary Examiner—Mark O. Budd
Attorney, Agent, or Firm—Brian L. Ribando

[57] ABSTRACT

A lightweight low reluctance rotor for a motor comprises a conductive pattern of a plurality of side-by-side coils formed on a flexible printed circuit board. The flexible board is rolled into a plural layer cylindrical drum and means are provided to interconnect non-adjacent coils to form a desired winding pattern.

4 Claims, 7 Drawing Figures

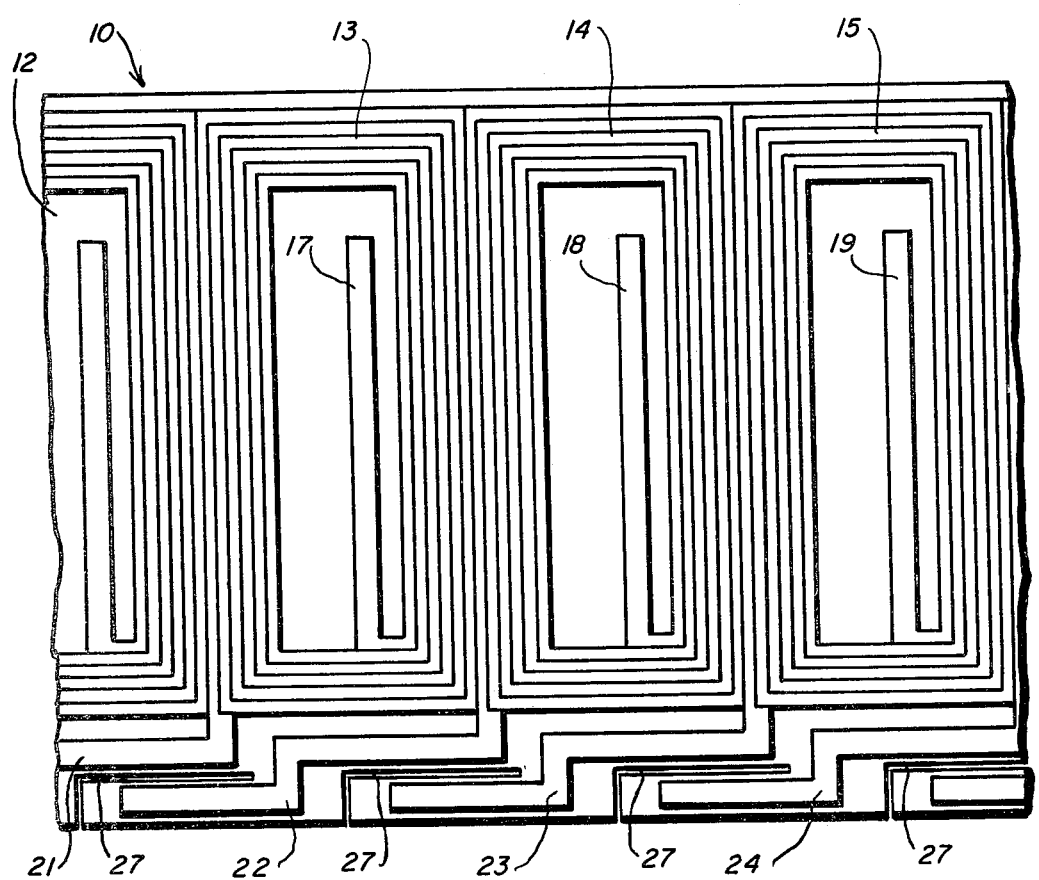
Fig_1
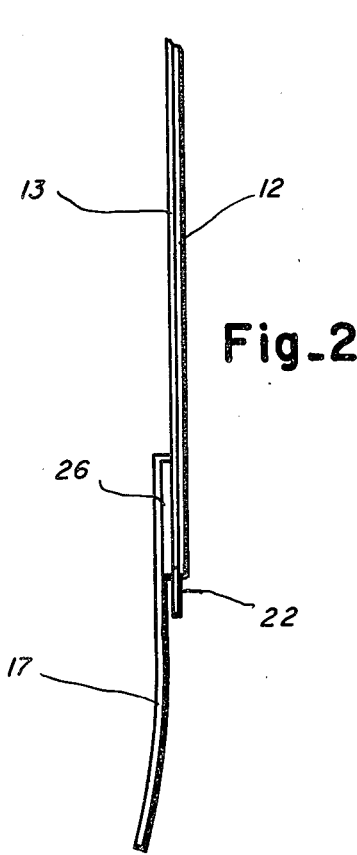
Fig_2
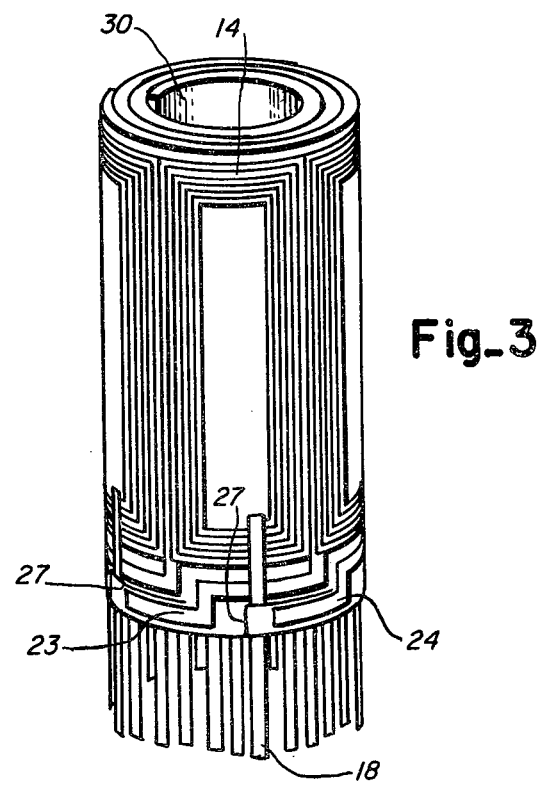
Fig_3

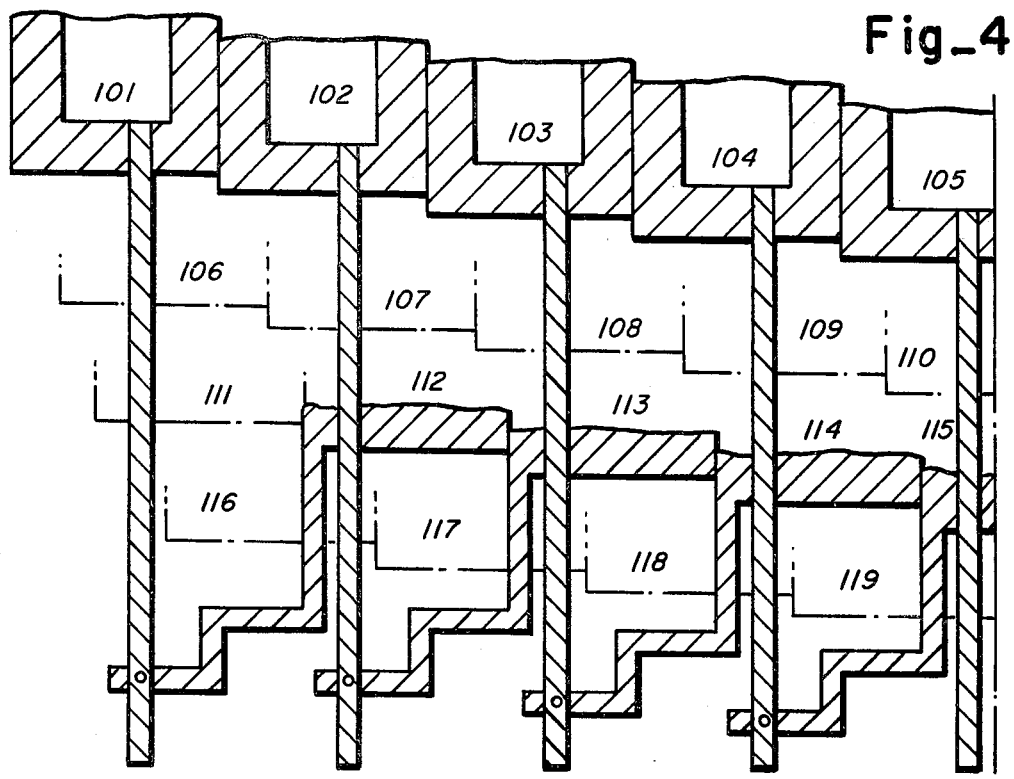
Fig_4
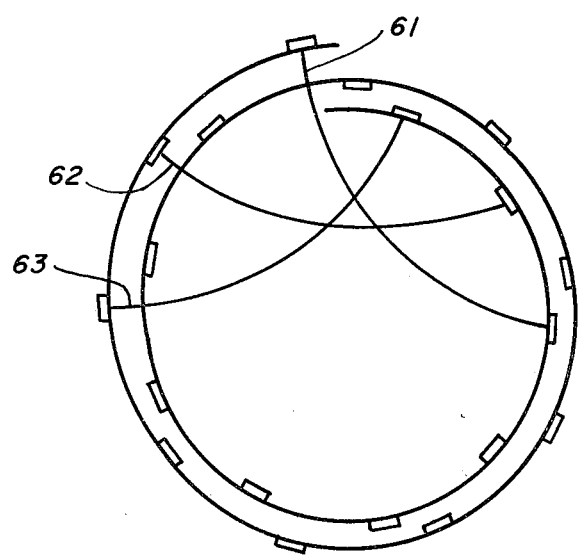
Fig_7

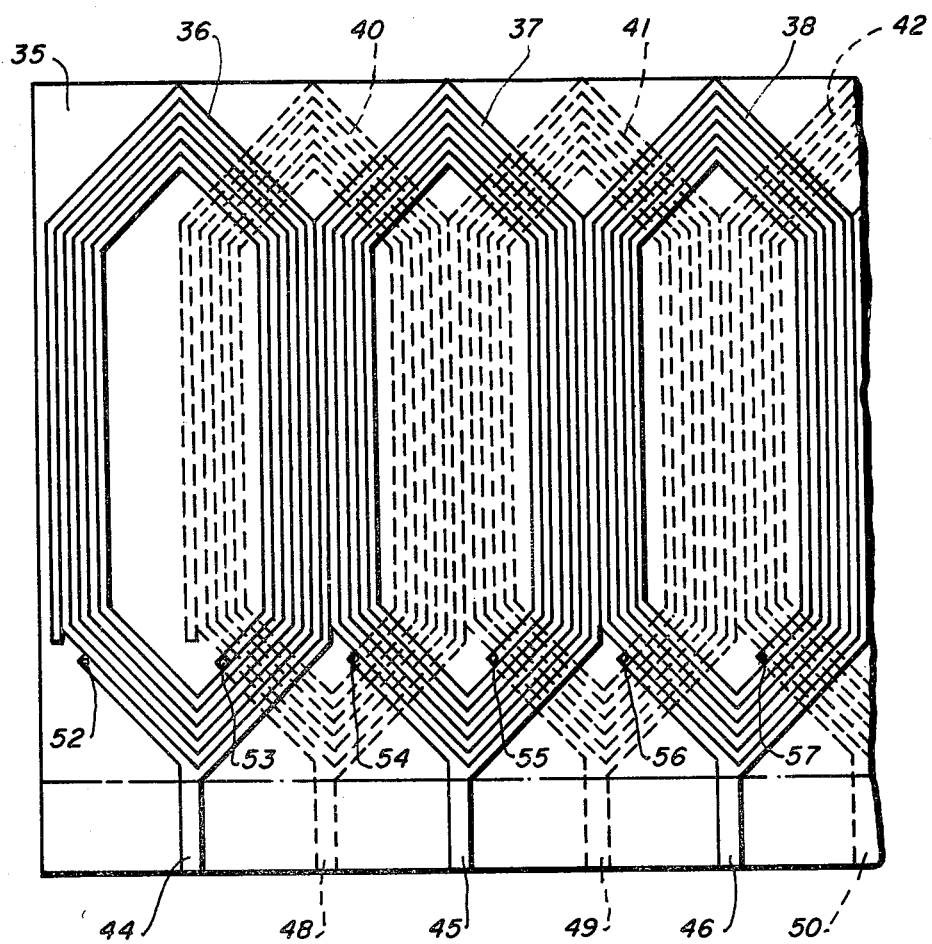
Fig_5
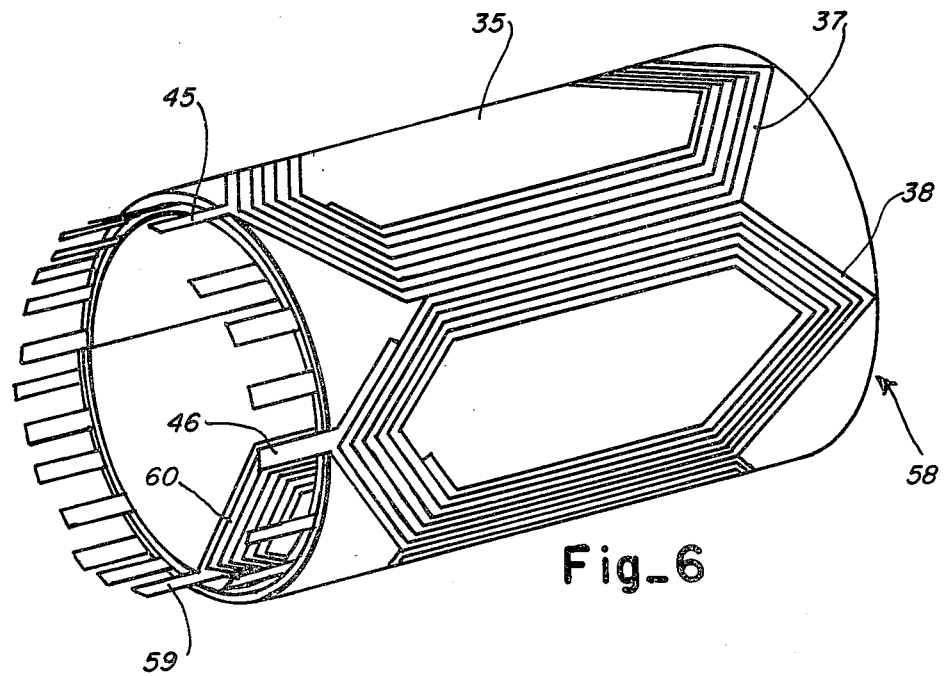
Fig_6

DOUBLE AIR GAP PRINTED CIRCUIT ROTOR

BACKGROUND OF THE INVENTION

The invention relates to a hollow low reluctance rotor having a wave winding thereon which is formed by printed circuit techniques.

Direct current permanent magnet motors are well known in the prior art. Such motors commonly employ iron in the rotor, but iron gives the rotor a high reluctance characteristic and a high inertial moment which inhibits rapid acceleration. It is known in the prior art to form a lightweight rotor by printed circuit techniques whereby a flexible substrate with strips of conductive material thereon is rolled into a cylindrical form. While it is often advantageous to interconnect non-adjacent windings of a rotor in order to achieve desired winding pattern, such interconnections are difficult to effect on a printed circuit rotor and are not taught by the prior art.

SUMMARY AND OBJECTS OF THE INVENTION

The rotor of the instant invention is produced by forming a conductive pattern which comprises a plurality of coils placed in side-by-side relationship on a flexible printed circuit board. Means are provided for interconnecting non-adjacent coils with one another, and the board is thereafter rolled into a cylindrical drum shape which comprises a plurality of layers. By properly selecting the number of coils, the interconnection pattern, the number of layers into which the board is rolled, and the number of motor poles, a winding pattern can be produced.

It is, therefore, an object of the present invention to provide a hollow, low reluctance rotor having a winding pattern thereon which is formed by printed circuit techniques.

It is another object of the invention to provide a hollow, low reluctance rotor comprising a conductive coil pattern with non-adjacent coil interconnections on a flexible printed circuit board which is rolled into a cylindrical drum shape.

These and other objects of the invention will become apparent from the following detailed description taken in conjunction with the accompanying drawing figures.

BRIEF DESCRIPTION OF THE DRAWINGS

FIG. 1 is a partial plan view of a rotor formed by printed circuit techniques.

FIG. 2 is a side view of the rotor of FIG. 1.

FIG. 3 is a perspective view of the rotor of FIG. 1 rolled into a cylindrical drum shape.

FIG. 4 is a schematic view of the coil interconnections of the rotor of FIG. 3.

FIG. 5 is a plan view of an alternate form of rotor formed by printed circuit techniques.

FIG. 6 is a perspective view of the rotor of FIG. 4 rolled into a cylindrical drum shape.

FIG. 7 is an end view of a two layer rotor comprising coil patterns on two sides of a substrate.

DESCRIPTION OF THE PREFERRED EMBODIMENT

Referring now to the drawings, there is shown in FIG. 1 a segment of a printed circuit rotor generally designated by the reference numeral 10. The printed circuit comprises a flexible nonconducting substrate 12 and a plurality of conductive coil forms 13, 14, and 15. The conductive coil forms 13, 14, and 15 are shown as being generally rectangular in shape, but it will be understood that other coil shapes may be advantageously employed.

The conductive coils are integrally formed with central tabs 17, 18, and 19 and with leg portions 21, 22, 23, and 24. It will be seen from tracing the patterns which are formed on the flexible substrate 12 that the leg portion 21 is coupled to the conductive coil 13, that the leg portion 22 is coupled to the conductive coil 14, and that the leg portion 23 is coupled to the conductive coil 15. It will also be evident that the central tabs 17, 18, and 19 are coupled to the conductive coils 13, 14, 15, respectively.

The central tabs 17, 18, and 19 are used to interconnect the coils to one another and to couple the conductive coils to the commutator structure of a completed rotor for use in a motor. This coupling may be effected by peeling the central tabs from the flexible substrate 12 and folding the tabs through an angle of 180° to provide the structure as shown in a side view at FIG. 2. In order to prevent shorting between the coil portion 13 and the folded tab 17 and between the leg portion 22 and the folded tab 17, a sheet of insulation material 26 may be positioned over the lower portion of the conductive coil and the leg portions before the tab is folded flat as shown. The insulation material 26 may be provided with an adhesive in order to simplify manufacturing procedures.

After the central tabs have been positioned as shown in FIG. 2, the prepared substrate 12 may be rolled into a cylindrical drum 30 as shown in FIG. 3. The drum 30 may have a circumference equal to the width of 4¾ of the printed coils as shown in FIG. 1. The ends of the central tabs which extend below the body of the drum 30 may be connected directly to the commutator structure of a rotor, or in the alternative, may themselves act as commutator segments. The ends of the central tabs are also used to interconnect non-adjacent coils to one another. Slits 27 may be formed in the substrate 12 in the region of the leg portions 24 and the central tabs may be threaded through these slits in order to connect with the leg portion at a coil located on another layer of the drum 30.

One possible coil interconnection pattern is shown schematically in FIG. 4. The folded over central tabs may be each connected to a leg portion so that a desired winding pattern is produced. The central tab from coil 101 is connected to the leg portion from the coil 112 and the central tab from coil 102 is connected to the leg portion from the coil 113. In a like fashion, the central tabs from the following coils are connected to the leg portions of the following coils, respectively: 103 to 114; 104 to 115; 105 to 116; 106 to 117; 107 to 118; 108 to 119; 109 to 101; 110 to 102; 111 to 103; 112 to 104; 113 to 105; 114 to 106; 115 to 107; 116 to 108; 117 to 109; 118 to 110; and 119 to 111. It will be appreciated that the shape of the leg portions and the threading of the central tabs from one layer to another allow non-adjacent coils to be connected to one another in a serial fashion. This serial connection allows a wave winding to be formed.

The number of coils comprising the rotor and the number of turns into which the substrate is rolled to form the rotor may be adjusted as desired. For instance, a rotor for use in a four pole motor could comprise eleven coils rolled into a drum having three turns, wherein the drum would have a circumference equal to the width of 3⅝ coils.

Turning now to FIG. 5, there is shown a flexible substrate 35 having conductive coils 36, 37, and 38 on one side thereof and coils 40, 41, and 42 on the opposite side thereof. The coils 36, 37, and 38 are coupled to the lower tabs 44, 45, and 46, and the coils 40, 41, and 42 are coupled to the lower tabs 48, 49, and 50. It will be noted that the coils 36-38 are in staggered relationship to the coils 40-42. It will also be noted that the lower tab 44 is coupled to the coil 37, while the lower tab 45 is coupled to coil 38 and so on. Also, tab 48 is coupled to the coil 41 and tab 49 is coupled to the coil 42. That is, each lower tab is coupled to the coil adjacent to the coil under which the tab is located.

A series of plated through holes 52-57 are provided in order to couple coils 36-38 located on the front of the substrate 35 to the coils 40-42 located on the back of the substrate 35. It can be determined from tracing around the coils that beginning at the tab 44, a continuous path extends from tab 44 to coil 37, and around coil 37 to the interior portion thereof, then through plated hole 55 to coil 41, then to outer tab 49 and around coil 42 to the interior thereof to a plated through hole which is not shown.

Turning now to FIG. 6, it will be seen that the flexible substrate 35 can be rolled into a cylindrical drum shape which is hollow and which forms a rotor 58 for a motor. The tabs such as 45, 56, and 59 which protrude from one end of the rotor may be used as commutator segments or may be connected to commutator segments so that a current may be supplied to the coil patterns 37, 38, and 60. It should be noted that certain relationships may be used to properly dimension the coil patterns and the rotor 58 itself for optimum operation in a motor. For instance, where a six pole motor is desired, nineteen coils may be printed on a flexible circuit board, ten coils being on one side and nine coils being on the other. The patterns of coils on the opposite sides are arranged in staggered relationship to one another, and the resulting printed board may be rolled upon itself twice so that the circumference around the resulting rotor drum equals the side-by-side length of 4¾ of the printed coils.

Referring now to FIG. 7, an end view of a two layer rotor comprising coil patterns on two sides of a substrate is schematically shown. It will be noted that three connections 61, 62, and 63 join the last three coils on one end of the substrate with the last three coils on the other end of the substrate. These connections, together with the plated through holes which couple the ends along the intermediate portion of the substrate, complete the coil interconnections on the two sides of the printed circuit rotor.

A construction as described will give a rotor having a winding pattern which will interact with magnetic poles of a motor. If the nineteen coils are all formed on one side of the flexible printed circuit board, then the board must be rolled upon itself four times in order to provide a rotor having the required electrical characteristics. The circumference of the resulting rotor will be equal to the width of 4¾ of the adjacent coil patterns. Other combinations of the number of coils printed on the circuit board and the number of poles in the motor in which the rotor is to be used will occur to those skilled in the art.

Having thus described the invention, various modifications and alterations will occur to those skilled in the art, which modifications and alterations are intended to be within the scope of the present invention as defined in the appended claims.

I claim:

1. A coil structure for use in an electric motor, the coil structure comprising:
   a cylindrical drum comprising a length of flexible non-conducting substrate material rolled into a plural layer hollow tube-like shape,
   a plurality of side-by-side coils printed on both sides of the substrate material, the plurality of coils comprising nine coils on one side of the substrate and ten coils on the opposite side, the drum having a circumference equal to the width of four and three-quarters of a single printed coil,
   first means for coupling said coils to an external source of excitation, said first means comprising lower tabs positioned beneath and outside of each of said side-by-side coils, the lower tabs being printed integrally with the side-by-side coils,
   second means for coupling non-adjacent coils to one another in order to form a wave winding,
   plated through holes extending from one side of the substrate to the other comprising a portion of the second means, and
   jumper means connecting the first three coils on the substrate with the last three coils on the substrate comprising the remainder of the second means.

2. A coil structure for use in an electric motor, the coil structure comprising:
   a cylindrical drum comprising a continuous length of flexible non-conducting substrate material rolled into a plural layer hollow tube-like shape,
   a plurality of side-by-side coils printed on the substrate material,
   first means integrally printed with said coils for coupling said coils to an external source of excitation, said first means comprising a printed central tab positioned within the side-by-side coils, the printed central tab being peeled from said substrate to extend to a position which is outside of the side-by-side coils, and
   second means for coupling non-adjacent coils to one another, said second means comprising a leg portion on each of the side-by-side coils, each leg portion being continuous with a coil which is adjacent to the coil under which the leg portion is positioned, and being coupled with a peeled printed central tab.

3. A coil structure as in claim 2 further comprising:
   slit means formed in the flexible substrate beneath the coils and in alignment with the peeled central tabs, said central tabs passing through the slit means whereby connections are made between central tabs emanating from one layer with coils in a different layer.

4. A coil structure as in claim 3 further comprising:
   nineteen coils comprising the plurality of side-by-side coils wherein the drum has a circumference equal to the width of four and three-quarters of a single printed coil.

* * * * *